A. J. PERKINS.
FROST PROTECTION SYSTEM.
APPLICATION FILED MAY 29, 1916.

1,215,057.

Patented Feb. 6, 1917.

Inventor,
A. J. Perkins.

UNITED STATES PATENT OFFICE.

ALLEN JEFFERSON PERKINS, OF LAKE CHARLES, LOUISIANA.

FROST-PROTECTION SYSTEM.

1,215,057.  Specification of Letters Patent.  Patented Feb. 6, 1917.

Application filed May 29, 1916. Serial No. 100,581.

*To all whom it may concern:*

Be it known that I, ALLEN JEFFERSON PERKINS, a citizen of the United States, residing at Lake Charles, in the parish of Calcasieu and State of Louisiana, have invented certain new and useful Improvements in Frost-Protection Systems; and I do hereby declare the following to be a full, clear, and exact description of the invention, such as will enable others skilled in the art to which it appertains to make and use the same.

This invention relates to a process of and means for protecting fruit, or other trees and crops from the injuries due to frost or low temperatures, and has for its object to provide a means whereby these results will be attained in a manner more efficient than has been heretofore proposed.

With these and other objects in view the invention consists in the novel combinations of parts, and in the novel combinations of steps constituting the process, all as will be more fully hereinafter disclosed and particularly pointed out in the claims.

Referring to the accompanying drawings forming a part of this specification in which like numerals designate like parts in all the views—

Figure 1:
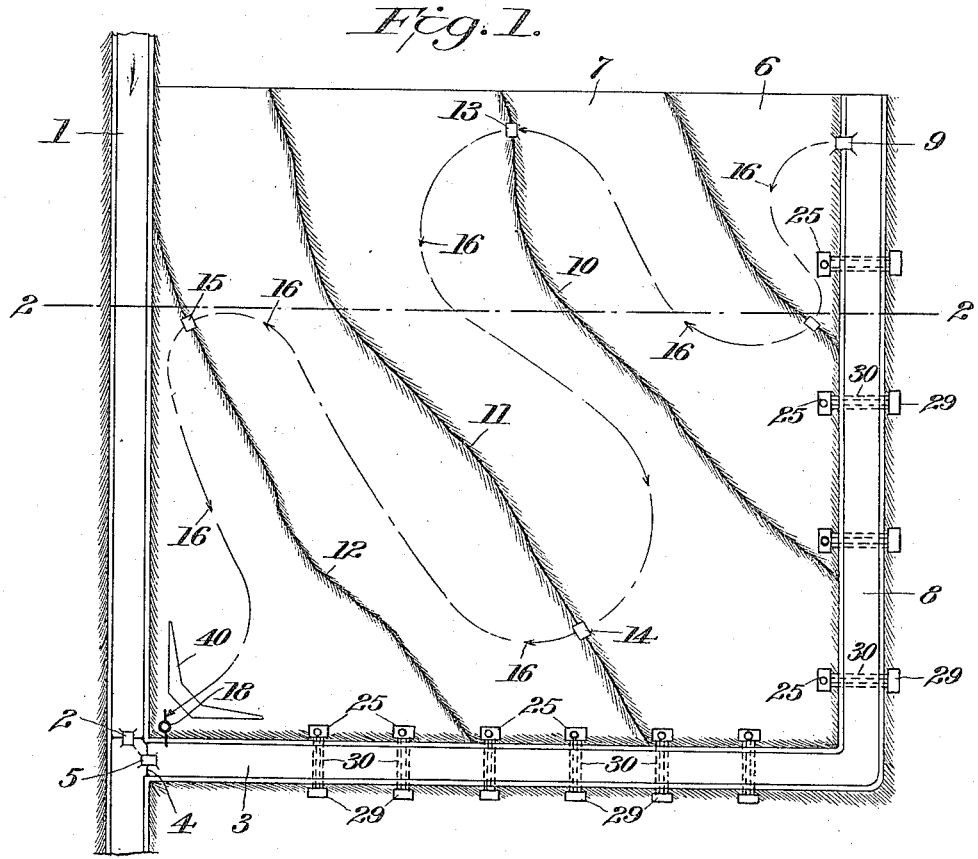
Figure 1 is a diagrammatic plan view of a plot of ground treated in accordance with this invention.
Figure 2:
Fig. 2 is a cross sectional view on the line 2—2 of Fig. 1.
Figure 3:
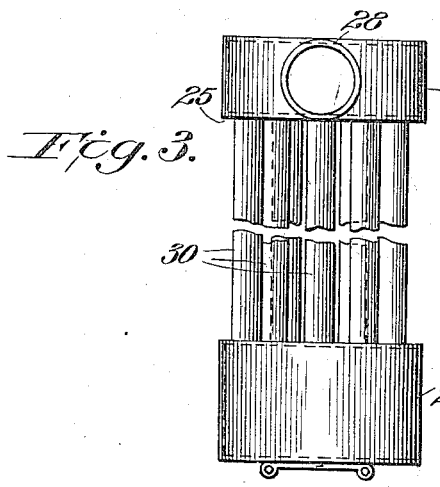
Fig. 3 is a diagrammatic plan view of a heating means adapted to be used in connection with the plot of ground shown in Fig. 1.
Figure 4:
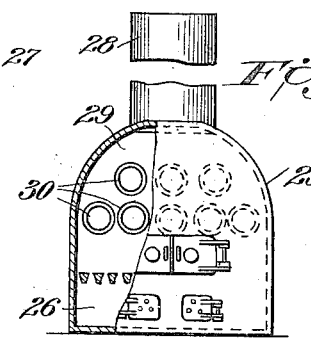
Fig. 4 is an end view partly in section of the parts shown in Fig. 3.

1 indicates any suitable water supply such for example as a canal or irrigating ditch, 2 any suitable means for controlling the head of water in the supply 1, 3 a distribution canal, ditch or other supply of water connected to the main supply 1 as at 4, and provided with any suitable means, such as 5 for controlling the flow of water from the supply 1 to the said distribution canal 3.

The said canal 3 is preferably led to the highest point 6 of the plot of ground 7, and to this end one or more additional channels or canals 8 may be employed.

The water having been conveyed by the distribution canals 3 and 8 to the highest point 6 of the acreage to be protected, any suitable means such as 9 is provided to regulate the distribution of water from the canal 8.

The water having reached the highest point 6 of the plot 7, it is permitted to flow by gravity to the lowest point or points thereof, it being arrested and diverted in its general flow by a system of levees, baffles or other obstructions such as 10, 11 and 12. These said obstructions are preferably located at substantially right angles to the slope of the ground, and across the line of flow of the water. Said levees or baffles are further provided at suitable points in their length with spillways indicated at 13, 14 and 15 respectively. These points are so selected that the spillways will have the effect of reducing the level or depth of the water on the various levels so that at all times the said water can be maintained at a constant depth or nearly so, over the entire orchard tract or garden.

Further, these said spillways are located in staggered relation to each other as indicated, so that the water will be forced to circulate from side to side and across the entire tract, or to follow a general course indicated by the arrows 16 for example.

After the water has thus circulated through the entire orchard or other tract, it finally is led to a collecting pit 18 preferably located at the lowest point of the tract, where a pump or other means not shown, for raising the water may be situated, and the said water forced back into the distribution channel 3, thus completing the cycle of operations. To facilitate the collection of water in the pit 18, I may provide any suitably shaped baffle 40 as indicated.

This cycle may be repeated as often as necessary or for such a length of time as may be found necessary to protect the crops.

The controlling means 2 and 5 may be in the form of flood or control gates or any other means suitable for the purpose, so that the water admitted to the distribution canal 3 may be only sufficient to make up for the losses due to evaporation, absorption, seepage, etc. It often happens that the temperature of the water used for flooding is not sufficient to thoroughly protect the fruit trees or other crops grown on the tract of land 7, and I therefore prefer to install a plurality of heaters 25 over which the water in the distribution channels 3 and 8 passes. The number and capacity of these heaters will depend upon the size of the tract 7 and also upon the increase of temperature it is wished to impart to the water. This number will also depend upon the usual or average conditions of the surrounding atmosphere, the prevailing winds, etc. These said heaters further may be of any suitable or desired design, but I prefer to make them of the general form of a flue boiler with the shell or jacket of said boiler omitted. That is to say I provide each heater 25 with a fire box such as 26, adapted to burn coal, wood or other fuel, with a smoke box such as 27, having a smoke stack 28, and with a fire box indicated at 29. The smoke box 27 and fire box 29 are located on opposite sides of the distribution channels or canals, and they are connected by a plurality of flues 30, so that the water in said channels will flow around and between said flues, thus extracting a maximum quantity of heat, all as will be readily understood.

The raising of the temperature of the water above that of the atmosphere in the manner just described, will cause a greater or less amount of vapor to be formed, which will settle on the fruit trees or other crops growing on the tract 7 and upon condensation of this vapor back into water its latent heat will be liberated and thus the said crops will be protected from frost in the manner well known.

This protection will be still further facilitated or assisted by the liberated smoke or heat from the heaters 25 and also by the other products of combustion, which smoke or heat and products will of course to a greater or less extent follow the vapor and carry with them a greater or less quantity of heat. In order to get the maximum beneficial effect from the smoke, the vapor, and products of combustion, it is desirable to place all or at least some of the heaters 25 in such positions that the prevailing winds at low temperature will give them the right drift, or will blow them over and through the orchard or crops.

It will thus be seen that by treating a tract 7 of land in the manner disclosed one is enabled to protect to a large extent or in fact to absolutely protect growing crops from the damaging results of frost or sudden lowerings of the atmospheric temperature. It is important in this connection that the water flowing over the said tract 7 shall take a general zig zag course as indicated, and that it be in constant or at least in frequent motion or circulation from side to side of the tract. By this means the tract is never allowed to experience a temperature sufficiently low to cause damage.

It is obvious that those skilled in the art may vary the arrangement of parts, as well as the details of the invention without departing from the spirit thereof, and therefore I do not wish to be limited to the above disclosure except as may be required by the claims.

What I claim is:

1. The process of protecting crops growing on a tract of land from an injurious lowering of the atmospheric temperature, which consists in repeatedly circulating water while heating the same at a plurality of places over said tract to a temperature sufficiently high to afford the intended protection, substantially as described.

2. The process of protecting crops growing on a tract of land from injurious changes in temperature which consists in causing water to flow by gravity to the highest point of said land; and from said highest point in a zig-zag course across and over said land to its lowest point; and raising said water to a temperature above that of the atmosphere during the protecting operation, substantially as described.

3. In a tract of land suitable for protection against frost, the combination of a main water channel; a distribution channel supplied from said main channel; a plurality of water heating means located under and across said distribution channel; controlling connections between said channels; controlling connections between said distribution channel and a selected point on the land to be protected; a plurality of baffles on said land adapted to cause the heated water to flow from said selected point across and over said land; and means for collecting said heated water at a single point on said land whence it may be delivered back to said distribution channel, substantially as described.

4. In a tract of land suitable for protection against frost, the combination of a main water channel; a distribution channel supplied from said main channel; means for heating the water as it flows along said distribution channel; controlling connections between said channels; controlling connections between said distribution channel and a selected point on the land to be protected; a plurality of baffles on said land adapted to cause water to flow from said selected point across and over said land; and means for collecting said heated water at a single point on said land whence it may be delivered back to said distribution channel, substantially as described.

In testimony whereof I affix my signature, in presence of two witnesses.

ALLEN JEFFERSON PERKINS.

Witnesses:
  LEON LOEDE,
  ALBERT J. IHLE.

Copies of this patent may be obtained for five cents each, by addressing the "Commissioner of Patents, Washington, D. C."